United States Patent Office 3,808,185
Patented Apr. 30, 1974

3,808,185
PROCESS FOR CARRYING OUT CHEMICAL REACTIONS INITIATED BY ORGANIC PEROXIDES
Hans Jaspers, Diepenveen, Hendrik Hansma, Schalkhaar, and Hendrik Harm Jannes Oosterwijk, Diepenveen, Netherlands, assignors to Akzo N.V., Arnhem, Netherlands
No Drawing. Filed Oct. 19, 1972, Ser. No. 299,082
Claims priority, application Netherlands, Nov. 1, 1971, 7114992
Int. Cl. C08f 1/60, 21/00
U.S. Cl. 260—93.5 R 7 Claims

ABSTRACT OF THE DISCLOSURE

A process for carrying out a chemical reaction particularly a radical polymerization or copolymerization, wherein a compound having the general formula:

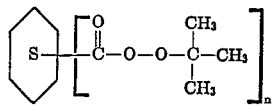

wherein $n=1$ or 2, is used as an initiator. Some of the compounds of the formula are novel and a method of preparing them is provided.

---

The present invention relates to a process for carrying out chemical reactions initiated by organic peroxides. In particular, the invention relates to radical polymerizations and copolymerizations with the aid of organic peroxides as initiators, such as the polymerization or copolymerization of monomers containing polymerizable

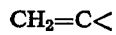

groups and also to the copolymerization of ethylenically unsaturated polyester resins. Further, the invention relates to new organic peroxides which are useful for initiating chemical reactions.

According to U.S. patent specification 3,367,994, the expression "unsaturated polyester resins" is to be understood to mean mixtures of unsaturated polyesters and one or more monomers containing one or more

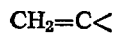

groups, for example, styrene, vinyl toluene, methylmethacrylate, diallyl phthalate and divinyl benzene. The same meaning is used in this specification.

The weight ratio of ethylenically unsaturated monomer to ethylenically unsaturated polyester generally ranges from 30–50 parts of monomer to 70–50 parts of polyester.

The unsaturated polyester may be obtained by reacting approximately equivalent amounts of a polyhydric alcohol, for example ethylene glycol, propylene glycol, diethylene glycol, or the like with an unsaturated dicarboxylic acid, for example maleic acid, fumaric acid, itaconic acid or the like, or the corresponding anhydrides. If desired a saturated acid, for example phthalic acid, isophthalic acid, tetrachlorophthalic acid, malonic acid, adipic acid, succinic acid or sebacic acid may be used in combination with one or more of the unsaturated acids.

The copolymerization of the unsaturated polyester and the monomer initiated by peroxidic initiators, for example dibenzoyl peroxide, ketone peroxides, such as cyclohexanone peroxide, acetylacetone peroxide or methylethylketone peroxide, peresters, such as tert.butylperoxy-2-ethyl hexanoate and tert.butylperbenzoate, perketals, such as 1,1-di-tert.butylperoxy-3,3,5-trimethylcyclohexane and 2,2-di-tert.-butylperoxy-4-methylpentane, and dialkyl peroxides, such as dicumyl peroxide has been disclosed heretofore.

In J. Am. Chem. Soc., 84 (1962) 2447, the preparation of tert.butylperoxycarbonyl cyclohexane is described and, in Chemical Communications, 1969, p. 98, reference is made to the preparation of alkenes from 1,2-bis(tert.-butylperoxycarbonyl)cyclohexane.

It is an object of this invention to provide an improved initiator for the radical polymerization or copolymerization of compunds containing $CH_2=C<$ groups. Another object of the invention is to provide novel organic peroxides. Still another object of the invention is to provide a process for making the novel peroxides.

It has now been found that peroxides having the general formula:

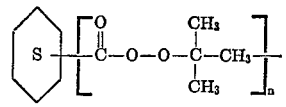

wherein $n=1$ or 2, is excellently suited for initiating chemical reactions, particularly radical polymerizations and copolymerizations of monomers containing polymerizable $CH_2=C<$ groups, such as styrene, acrylonitrile, acrylates and methacrylates at temperatures ranging from 70° to 110° C., preferably from 80° to 100° C., and the copolymerization of unsaturated polyester resins at temperatures ranging from 70° to 80° C. Moreover, these peroxides may be used as initiators in the high pressure polymerization of ethylene at temperatures over 150° C. Accordingly, one aspect of the invention is a process for carrying out a chemical reaction, particularly a radical polymerization or copolymerization, wherein a compound of the above-defined general formula is used as an initiator.

Another aspect of the invention is a process for preparing a compound of the above-identified general formula, which comprises reacting the sodium salt of tertiary butyl hydroperoxide with hexahydroterephthaloyl dichloride or with hexahydroisophthaloyl dicloride. Furter, the invention also contemplates the novel peroxides per se.

It has been found that the peroxide according to the invention have a rate of decomposition which lies between those of peroxides often used for the same purposes, viz benzoyl peroxide and tert.butylper-2-ethylhexanoate on the one hand and tert.-butylperbenzoate and tert.butylperacetate on the other hand. The rate of decomposition may be indicated by the half-life time of the peroxide, that is the time required for the decomposition of half the peroxide concerned at a given temperature (Modern Plastics, No. 6, 142, 1959). An indication with respect to the reactivity of the peroxides at a given temperature may be derived from the polymerization constant ($K_p$) having the formula:

$$R_p = K_p [M][I]^{1/2}$$

wherein:

$R_p$ = rate of polymerization
$K_p$ = rate of polymerization constant
$M$ = concentration of the monomer
$I$ = concentration of the initiator.

The peroxides to be used according to the invention are particularly advantageous for the radical polymerization of polymerizable vinyl monomers such as styrene. The compounds in which $n$ is 2 have the advantage that they are solids. Moreover, when using these compounds, vinyl polymers may be obtained having various advantageous properties. For example, particularly when the hitherto unknown peroxides di-tert.butylperoxyhexahydroterephthalate and di-tert.butylperoxyhexahydroisophthalate are used as initiators in the polymerization of styrene, a polystyrene is obtained with a much higher molecular weight than when benzoyl peroxide is used under comparable conditions. If a polystyrene is desired having a given molecular weight, this polymer may be obtained with the aid of di-tert.butylperoxyhexahydroterephthalate or di-tert.butylperoxyhexahydroisophthalate within a shorter time than with the aid of benzoyl peroxide as initiator, which is economically advantageous.

If it is desired to carry out the polymerization of vinyl monomers, for example styrene, in two temperature stages, for example at 90° C. and at above 100° C., the peroxides according to the invention may be advantageously used in combination with other peroxides, such as tert.-butylperbenzoate,
tert.-butylperacetate,
di-tert.butylperoxysuccinate,
di-tert.butylperoxyadipate,
di-tert.butylperoxyazelainate,
1,1-di-tert.butylperoxy-3,3,5-trimethylcyclohexane,
2,2-bis-(4,4'-di-tert.butylperoxycyclohexyl) propane,
di-tert.butylperoxide,
dicumyl peroxide,
1,3- and 1,4-di(tert.butylperoxyisopropyl) benzene, and
1,10-di-(tert.butylperoxy) decane or the like. In this way, polymers may be obtained having a high molecular weight and a small residual content of monomer.

Combinations of the peroxides according to the invention with tert.butylperpivalate, peroxydicarbonates, such as diisopropylperoxydicarbonate, diacyl peroxides, such as lauroyl peroxide, or azo compounds may be used for the polymerization of ethylene.

In the copolymerization of unsaturated polyester resins, accelerators, preferably cobalt naphthenate, cobalt isooctoate, cobalt isononanoate or the like, may also be used.

The polymerizations and copolymerizations with the aid of the initiators according to the invention may be carried out according to conventional techniques in the appropriate apparatus. The amount of initiator to be added depends on the polymerization or copolymerization conditions. For instance, the suspension polymerization of styrene with the aid of 1,4-di-tert.butylperoxyhexahydroterephthalate is desirably carried out at a temperature of 80°–100° C. with 0.05–10% by weight of initiator, calculated on the starting monomer. The polymerization may also be carried out by bulk polymerization or in the presence of a solvent. During the polymerization, a volatile organic solvent may also be present in which the polymer does not dissolve and which may be used for expanding the polymer after the polymerization by the formation of a polymer foam. Organic solvents are usable having a boiling point up to about 100° C., such as heptane, hexane and petroleum ether. The amount of volatile organic solvent used may vary from 2% to 15% calculated on the polymer present. If desired, phosphorus and bromine compounds may be added in order to reduce the inflammability of the foam.

If the same peroxide is used for initiating the copolymerization of an unsaturated polyester resin containing styrene as copolymerizable monomer, generally 0.1%–2% of the peroxide calculated on the styrene is added.

The preferred peresters according to the invention, namely di-tert.butylperoxyhexahydroterephthalate and di-tert.butylperoxyhexahydro-isophthalate, may be prepared in a way analogous to that known for the synthesis of related compounds, for example by reacting the sodium salt of tert.butylhydroperoxide in water with hexahydroterephthaloyl dichloride or hexahydroisophthaloyl dichloride.

The following examples illustrate the invention. Where in these examples data are given regarding the average molecular weight of polystyrene ($\overline{M}_v$), it is calculated from the intrinsic viscosity with the aid of the formula of J. W. Breitenbach (Monatshefte für Chemie, 81 (1950), 455–7). The intrinsic viscosity was determined with viscosity measurements of a solution of the polymer in toluene at 25° C.

The peroxides mentioned in the examples are indicated as follows:

(1) tert.butylperoxyhexahydrobenzoate
(2) di-tert.butylperoxyhexahydrophthalate
(3) di-tert.butylperoxyhexahydroisophthalate
(4) di-tert.butylperoxyhexahydroterephthalate
(5) benzoyl peroxide
(6) tert.butylperacetate
(7) tert.butylperbenzoate
(8) dicumyl peroxide.

EXAMPLE I 25 ml. ampoules were filled with a 0.1 molar solution of (1) in toluene. Subsequently, the ampoules were melted and put into a thermostat having a constant temperature. At various times an ampoule was taken out from the thermostat, cooled quickly and then the peroxide content in the solution was determined. By plotting the content against the time, a straight line was obtained. The point of intersection of this straight line and the line indicating a content of 50% marks the half-life time ($t\frac{1}{2}$) of the peroxide. By repeating at various temperatures, more $t\frac{1}{2}$ values were obtained. The plotting of $t\frac{1}{2}$ on a logarithmic scale against $$\frac{1}{T} \times 10^4$$

gave a straight line. By the extrapolation of this straight line to higher temperatures, the following values for the peroxides (1) to (4) according to the invention and for the known peroxides (5) to (8) were obtained.

| | $t\frac{1}{2}$ | |
|---|---|---|
| | 60 sec. at ° C. | 10 sec. at ° C. |
| Peroxide: | | |
| (1) | 142 | 163 |
| (2) | 143 | 164 |
| (3) | 145 | 166 |
| (4) | 147 | 168 |
| (5) | 134 | 153 |
| (6) | 163 | 185 |
| (7) | 168 | 192 |
| (8) | 178 | 202 |

EXAMPLE II

A solution of 0.1 g. of (1) in 50 g. of pure styrene was put into a dilatometer which subsequently was connected to a source of suction. Then the dilatometer was placed in a thermostat bath which had been adjusted to polymerization temperature. Subsequently the volume contraction during a given time was determined and from this the conversion and the $K_p$ value were calculated.

In an analogous way, the $K_p$ value of other peroxides was determined. The results obtained are tabulated below.

| | Percent conc. on monomer | $K_p \times 10^4$ | | |
|---|---|---|---|---|
| | | 80° C. | 90° C. | 100° C. |
| Peroxide: | | | | |
| (1) | 0.2 | 2.5 | 6.06 | |
| (2) | 0.2 | 2.36 | 6.48 | |
| (3) | 0.2 | 2.52 | 6.68 | |
| (4) | 0.2 | 2.71 | 6.74 | |
| (5) | 0.2 | 3.6 | 8.2 | |
| (6) | 0.2 | 0.83 | 1.75 | 4.8 |
| (7) | 0.2 | | 1.70 | 4.6 |
| (8) | 0.2 | | | 1.5 |

EXAMPLE III

A mixture of 600 ml. of demineralized water, 0.6 g. of polyvinylalcohol, 200 g. of styrene and 0.38 g. of (1) was polymerized with vigorous stirring at a temperature of 90° C. for 8 hours. Subsequently the polystyrene formed was filtered off and dried. Then, in order to calculate the average molecular weight of the polystyrene, the intrinsic viscosity was measured and also the percentage of styrene not polymerized was measured.

In an analogous way, tests were made with other peroxides under other conditions.

V and then the mixture was heated to 80° C. The gel time, minimum cure time and peak exotherm were measured. The results obtained are tabulated below.

| | Percent | | Bath temp. | Gel time (min.) | Minimum cure time (min.) | Peak exotherm (° C.) |
|---|---|---|---|---|---|---|
| | Peroxide | Cobalt | | | | |
| Peroxide: | | | | | | |
| (3) | 1 | 0.01 | 80 | 11 | 12.5 | 247 |
| (3) | 1 | | 80 | 5.2 | 6.2 | 253 |
| (4) | 1 | 0.01 | 80 | 9.4 | 11.2 | 248 |
| (4) | 1 | | 80 | 4.0 | 5.0 | 247 |

The results obtained are tabulated below.

| | Percent by weight based on monomer | Polymerization time | Percent conversion | $\bar{M}_v$ |
|---|---|---|---|---|
| Peroxide: | | | | |
| (1) | 0.19 | 8 | 97 | 200,000 |
| (2) | 0.19 | 8 | 89 | 290,000 |
| (3) | 0.16 | 8 | 93 | 300,000 |
| (4) | 0.13 | 8 | 99 | 330,000 |
| (5) | 0.2 | 8 | 98 | 180,000 |
| (2) | 0.26 | 6 | 90 | 170,000 |
| (3) | 0.26 | 6 | 100 | 190,000 |
| (4) | 0.26 | 6 | 100 | 183,000 |
| (5) | 0.4 | 6 | 99 | 73,000 |

EXAMPLE IV

In an analogous way to that described in Example III styrene was polymerized in two temperature stages with combinations of a peroxide according to the invention and a peroxide known per se. The combination used, quantities and results obtained are tabulated below. The polymerizations with the combinations containing (7) were carried out for 7 hours at a temperature of 90° C. followed by a polymerization for 4 hours at 115° C. The polymerizations with the combinations containing (8) were carried out for 6 hours at a temperature of 90° C. followed by a polymerization for 3 hours at 130° C.

| Combination of peroxides | Percent by weight based on monomer | Percent conversion | $\bar{M}_v$ |
|---|---|---|---|
| (1)+(7) | 0.19 | 0.05 | 99.8 | 185,000 |
| (4)+(7) | 0.13 | 0.05 | 99.8 | 340,000 |
| (1)+(8) | 0.19 | 0.05 | 99.7 | 715,000 |
| (4)+(8) | 0.13 | 0.05 | 99.8 | 320,000 |

EXAMPLE V

1% by weight of peroxide was added to an all-purpose "standard" resin consisting of 67 parts by weight of an unsaturated polyester obtained by reacting 1 mol of phthalic anhydride, 1 mol of maleic anhydride and 2.1 mol of propylene glycol to an acid number of 35, and 33 parts by weight of styrene containing 0.01% of hydroquinone and 0.005% of 4-tert.-butyl-catechol, and then the mixture was heated to 70° C. The gel time, minimum cure time and peak exotherm were measured. The results obtained are tabulated below.

| | Percent peroxide with respect to the resin | Bath temp. | Gel time (min.) | Minimum cure time (min.) | Peak exotherm (° C.) |
|---|---|---|---|---|---|
| Peroxide: | | | | | |
| (1) | 1 | 70 | 18 | 21.8 | 220 |
| (2) | 1 | 70 | 29.4 | 34.1 | 222 |
| (3) | 1 | 70 | 29.3 | 33.8 | 222 |
| (4) | 1 | 70 | 29.4 | 33.7 | 227 |
| (5) | 1 | 70 | 4.5 | 16.5 | 223 |
| (7) | 1 | 80 | 40 | 49.9 | 200 |

EXAMPLE VI

1% by weight of peroxide and 1% by weight of a 1% solution of cobalt octoate in dioctylphthalate were added to the all-purpose "standard" resin described in Example V and then the mixture was heated to 80° C. The gel time, minimum cure time and peak exotherm were measured. The results obtained are tabulated below.

EXAMPLE VII 52 g. (0.9 mol) of NaCl and 2 drops of an emulsifying agent were added to a solution of 58 g. (0.52 mol) of tert.-butylperoxysodium in 160 ml. of $H_2O$ and subsequently 0.2 mol of hexahydroterephthaloyl dichloride dissolved in 20 ml. of benzene were added with a stirring at a temperature of 20°–25° C. After stirring for 2 hours at the same temperature, 150 ml. of benzene were added to the reaction mixture which was subsequently washed with dilute sodium lye and NaCl solution. After the benzene had been distilled off under reduced pressure, 50.5 g. of di-tert.butylperoxyhexahydroterephthalate were obtained under decomposition, having an active O-content of 9.70% (theor. 10.13%), melting point 80°–96° C. After storage for 6 months at 25° C., the active O-content had not fallen.

In an analogous way, di-tert.-butylperoxyhexahydroisophthalate was prepared from hexahydroisophthaloyl dichloride, having an active O-content of 9.78%; melting point 50°–53° C. After storage for 6 months at 25° C., the active O-content had not fallen.

Although the invention has been described in detail for the purpose of illustration, it is to be understood that such detail is solely for that purpose and that variations can be made therein without departing from the spirit and scope of the invention except as it may be limited by the claims.

What is claimed is:

1. A process for the radical polymerization or copolymerization of ethylenically unsaturated compounds in the presence of an initiator, wherein the initiator is an organic peroxide having the formula:

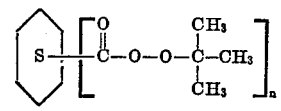

wherein $n=1$ or 2.

2. The process of claim 1, wherein a monomer containing a vinyl or vinylidene group is copolymerized with another monomer containing a vinyl or vinylidene group and $n=2$.

3. The process of claim 1, wherein an ethylenically unsaturated monomer is copolymerized with an unsaturated polyester derived from a polyhydric alcohol and one or more dicarboxylic acids selected from the group consisting of unsaturated dicarboxylic acids and unsaturated dicarboxylic acids in combination with saturated carboxylic acids.

4. The process of claim 3, wherein the initiator is di-tertiary-butylperoxy hexahydroterephthalate.

5. The process of claim 1, wherein an ethylenically unsaturated monomer is polymerized.

6. The process of claim 5, wherein the monomer is styrene.

7. The process of claim 1, wherein an accelerator is included with the initiator.

References Cited
UNITED STATES PATENTS

| | | | |
|---|---|---|---|
| 3,341,507 | 9/1967 | Guillet et al. | 260—89.1 |
| 3,408,423 | 10/1968 | Friedman et al. | 260—872 |
| 3,528,956 | 9/1970 | Gerritsen et al. | 260—92.8 |

OTHER REFERENCES

Chem. Abstracts, 69, 51367 g (1968).
Chem. Abstracts, 70, 67717c (1969).

HAROLD D. ANDERSON, Primary Examiner

E. A. NIELSEN, Assistant Examiner

U.S. Cl. X.R.

260—861, 80 C, 80.3 R